US006523875B1

(12) United States Patent
Ostholt

(10) Patent No.: US 6,523,875 B1
(45) Date of Patent: Feb. 25, 2003

(54) APPARATUS FOR GRASPING A LOAD FROM ABOVE OR FROM THE SIDE, IN PARTICULAR FOR USE IN A MANIPULATOR

(75) Inventor: Rüdiger Ostholt, Wetter (DE)

(73) Assignee: Atecs Mannesmann AG, Düsseldorf (DE)

( * ) Notice: Subject to any disclaimer, the term of this patent is extended or adjusted under 35 U.S.C. 154(b) by 0 days.

(21) Appl. No.: 09/718,853

(22) Filed: Nov. 22, 2000

(30) Foreign Application Priority Data

Nov. 29, 1999 (DE) ........................................ 199 58 834

(51) Int. Cl.[7] ................................................ B25J 15/08

(52) U.S. Cl. ......................... 294/88; 294/119.1; 901/37

(58) Field of Search ........................... 294/86.4, 88, 93, 294/103.1, 119.1; 269/25, 32–34; 414/741, 751.1; 901/36–39

(56) References Cited

U.S. PATENT DOCUMENTS

| | | | | |
|---|---|---|---|---|
| 2,896,994 A | * | 7/1959 | Fischer | 294/119.1 X |
| 4,611,846 A | * | 9/1986 | Feiber et al. | 294/119.1 X |
| 4,680,523 A | * | 7/1987 | Goumas et al. | 294/119.1 X |
| 4,892,344 A | * | 1/1990 | Takada et al. | 294/119.1 X |
| 5,090,757 A | * | 2/1992 | Huber et al. | 294/119.1 X |
| 5,529,359 A | * | 6/1996 | Borcea et al. | 294/119.1 X |
| 5,947,539 A | * | 9/1999 | Long et al. | 294/119.1 |

FOREIGN PATENT DOCUMENTS

| | | | | |
|---|---|---|---|---|
| EP | 0 532 174 A1 | | 3/1993 | |
| GB | 2147268 | * | 5/1985 | 294/119.1 |
| GB | 2255070 | * | 10/1992 | 294/119.1 |
| SU | 1404328 | * | 6/1988 | 294/119.1 |

* cited by examiner

*Primary Examiner*—Johnny D. Cherry

(57) ABSTRACT

Apparatus for grasping a load from above or from the side, in particular for use in a manipulator, includes two parallel elongate beams, and two carriers extending in a direction of the elongate beams, with each of the carriers supported by a corresponding one of the elongate beams and guided for displacement longitudinally in the direction of the elongate beams. The carriers are disposed in spaced-apart relationship, when viewed in a longitudinal direction of the carriers, and are movable relative to one another at least over a portion of a longitudinal extension of the carriers. Two confronting grippers are secured to the ends of the carriers and positioned on the outside of the carriers, when viewed in a direction transversely to the carriers and when the carriers are completely moved apart. A primary fluid-operated system is provided for moving the carriers in opposition to one another.

18 Claims, 7 Drawing Sheets

8a
2
11
8a
8
9
10
8
4
26
5
5
4
6
3
1
1
7

APPARATUS FOR GRASPING A LOAD FROM ABOVE OR FROM THE SIDE, IN PARTICULAR FOR USE IN A MANIPULATOR

CROSS-REFERENCES TO RELATED APPLICATIONS

This application claims the priority of German Patent Application Serial No. 199 58 834, filed Nov. 29, 1999, the subject matter of which is incorporated herein by reference.

BACKGROUND OF THE INVENTION

The present invention relates to an apparatus for grasping a load from above or from the side, in particular for use in a manipulator.

It is generally known to provide a gripping apparatus for grasping loads with two confronting gripper jaws which normally are arranged underneath across an elongate beam. The gripper jaws are hereby movable in opposition to one another and mounted to the elongate beam, whereby both gripper jaws may be movably arranged, or one of the gripper jaws may be fixed in place through securement to the elongate beam. There are also proposals to guide the gripper jaws on two parallel elongate beams to enhance the absorption of lateral forces.

Common to all conventional gripping apparatuses is their lack of a compact structure which would enable the use of a gripping apparatus, especially for use in a manipulator, in narrow containers for picking up workpieces or the like while yet applying a greatest possible gripping stroke.

SUMMARY OF THE INVENTION

It is thus an object of the present invention to provide an improved apparatus for grasping loads, obviating the aforestated drawbacks.

In particular, it is an object of the present invention to provide an improved apparatus for grasping loads from above or from the side, especially for use in a manipulator while yet applying a greatest possible gripping stroke even in narrow and tight openings.

These objects, and others which will become apparent hereinafter, are attained in accordance with the present invention by providing a pair of elongate beams in parallel relationship, a pair of carriers, extending in a direction of the elongate beams and disposed in spaced-apart relationship, when viewed in a longitudinal direction of the carriers, each of the carriers supported by a corresponding one of the elongate beams and guided for displacement longitudinally in the direction of the elongate beams relative to the other one of the carriers at least over a portion of a length of the carriers, a pair of confronting grippers mounted respectively to ends of the carriers above or below the elongate beams and positioned on the outside of the carriers, when viewed transversely to the carriers and when the carriers are completely moved apart; and a primary fluid-operated system for moving the carriers in opposition to one another.

In this manner, the gripping apparatus according to the present invention has a very compact configuration.

Suitably, both elongate beams are configured as profiled rails to attain a precise guidance of the carriers while sufficiently absorbing transverse forces. The guidance of the elongate beams can be further improved when each carrier is mounted to a runner which at least partially embraces the profiled rail and engages the profile of the profiled rail.

According to another feature of the present invention, each of the running elements has a U-shaped configuration and includes balls circulating in the running element for support upon a corresponding one of the profiled rails. This configuration is effective in particular for absorption of transverse forces.

According to another feature of the present invention, the elongate beams and the carriers are fitted in a housing, whereby each of the carriers has a first attachment which projects out of the housing for securement to a corresponding one of the grippers. Suitably, each of the grippers is configured as a plate-shaped clamping jaw.

According to another feature of the present invention, the primary fluid-operated system includes two fluid-operated mechanisms supported on opposite sides of the housing and operatively connected to the carriers in one-to-one correspondence, with each of the fluid-operated mechanisms including a pneumatic cylinder and a piston rod moveable in and out of the pneumatic cylinder. Such a configuration results in a compact structure while realizing high grasping or clamping forces. Suitably, whereas each pneumatic cylinder is secured to the housing, the piston rods are secured to a second attachment of the carriers. To further enhance the compactness of the gripping apparatus according to the present invention, the first and second attachments are disposed on different ends of the carriers and face away from one another.

In order to accomplish a synchronization of a movement of the carriers, the gripping apparatus according to the present invention has a synchronizing mechanism which includes a pair of racks disposed in parallel relationship to the elongate beams and respectively mounted to one end of the second attachment of the carriers, and a pinion disposed between and in mesh with the racks. Thus, the movement of the racks in opposition to one another is synchronized.

According to another feature of the present invention, the gripping apparatus is equipped with an emergency holding mechanism that allows the grippers to maintain their grasping position, when a pressure drop in the primary fluid-operated system and a resultant decrease of a clamping force during load transport are encountered. The emergency holding mechanism includes a pair of multiple-plate assemblies, with each of the multiple-plate assemblies including a first set of flat plates spaced equally from one another in parallel relationship to the elongate beams and securely fixed to a free end of a corresponding one of the second attachments of the carriers, a second set of flat plates securely fixed to one end of the housing, whereby the plates of the first and second sets of flat plates bear laterally upon one another, and an adjuster compressing the plates of the first and second sets of plates from the side, when encountering a pressure drop of the primary fluid-operated system and a resultant decrease of the clamping force exerted by the grippers. The adjuster of each multiple-plate assembly provides a forced engagement between the plates so that the grippers are prevented from moving apart even when a pressure drop is encountered in the primary fluid-operated system.

The adjuster may be configured as a swingable double-arm lever, having one end acted upon by a spring force, and another end acted upon by a counterforce in correspondence to the pressure applied by the pneumatic cylinder of the primary fluid-operated system, so that the adjuster presses against the plates at a force which corresponds to a difference of the spring force and the counterforce. The counterforce may be implemented by a secondary fluid-operated system which includes for each multiple-plate assembly a pneumatic auxiliary cylinder and a piston rod moveable in and out with respect to the pneumatic auxiliary cylinder, with the piston rod acting upon the other end of the double-arm lever. Suitably, a single pressure source is used for supply of fluid to the pneumatic auxiliary cylinders of the secondary fluid-operated system and the pneumatic cylinders of the primary fluid-operated system.

According to another feature of the present invention, the double-arm lever is configured as a triangular plate, with two neighboring corners defining the one end of the lever and the other end of the lever, and a third corner of the lever defining the adjuster. The third corner juts hereby out from the double-arm lever as a lobe and is pressed against the plates when the double-arm lever swings.

Suitably, the triangular plate defines a center and is rotatable about the center to thereby realize favorable lever proportions.

According to another feature of the present invention, the housing is made of two housing parts which are open on one end and fit within one another at a formation of a gap-like free space, with spacer elements received in the free space for interconnecting the housing parts.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
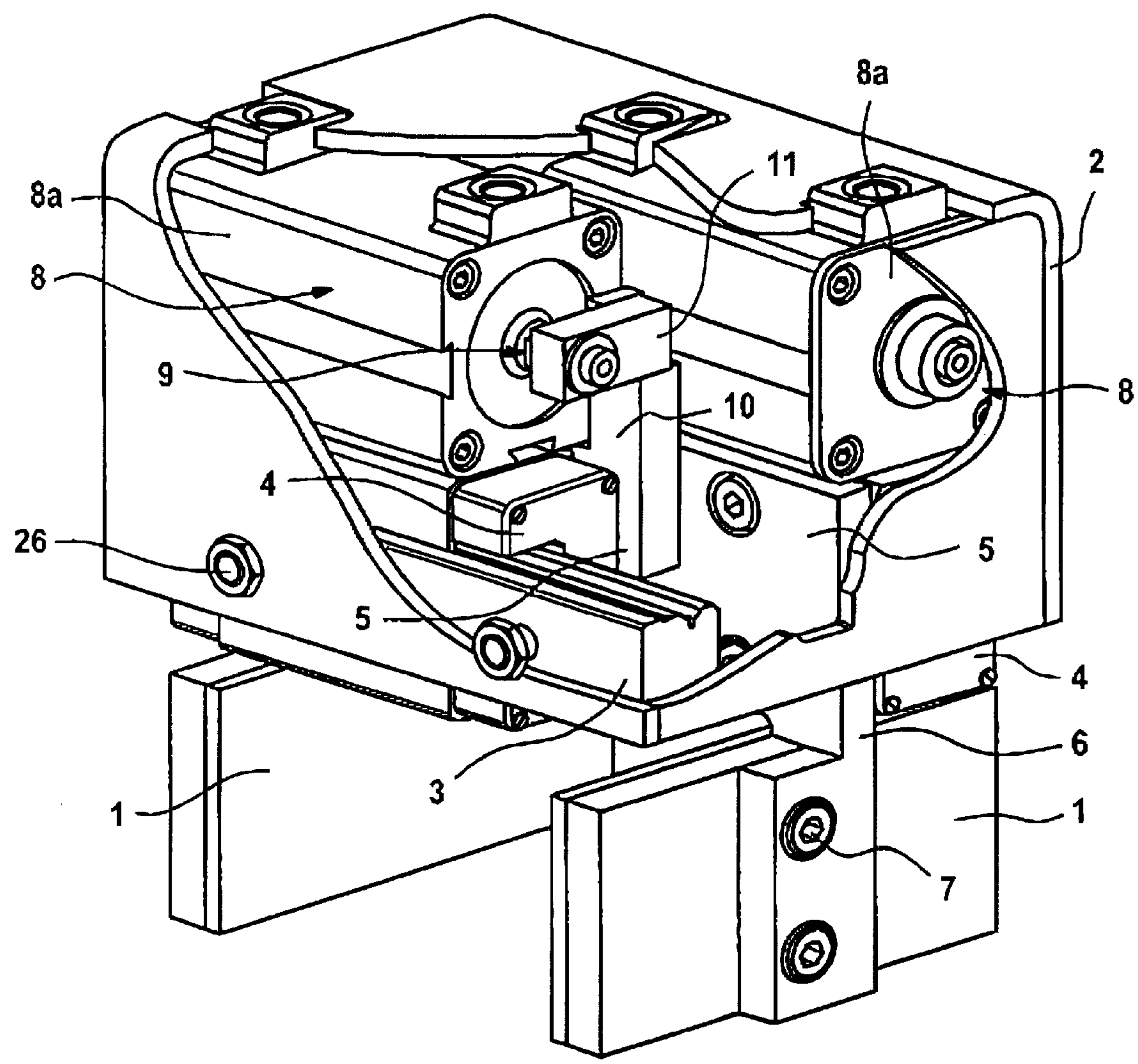
FIG. 1 is a three-dimensional illustration of a gripping apparatus for grasping a load in accordance with the present invention, with portions of the housing broken away to show internal components.

Throughout all the Figures, same or corresponding elements are generally indicated by same reference numerals.

Turning now to the drawing, and in particular to FIG. 1, there is shown a three-dimensional illustration of a gripping apparatus for grasping a load in accordance with the present invention, including a housing 2 and two grippers 1 having confronting plate-shaped clamping jaws projecting out from underneath the housing 2. For ease of illustration, portions of the housing 2 are broken away in FIG. 1 to show internal components of the gripping apparatus. Fitted inside the housing 2 are two elongate beams 3 (only one is visible in the depiction of FIG. 1) which extend in a common plane in parallel relationship and are configured as profiled rails, as shown in particular in FIG. 3. The elongate beams 3 are fixed in place adjacent to the inside of two opposite sidewalls of the housing 2 by screw fasteners 26. Guided for displacement along each elongate beam 3 is a longitudinal carrier 5 which extends longitudinally in the direction of the elongate beam 3 and is secured to a runner 4 for support upon and displacement along the elongate beam 3. Both carriers 5 are laterally spaced from one another, when viewed in the direction of the elongate beams 3 and move relative to one another over a portion of the carrier length so that the carriers 5 overlap along a portion, when viewed from the side.

Formed to one of the ends of each of both carriers 5 is an attachment 6 which projects out from underneath the housing 2. The attachments 6 of the carriers 5 are respectively mounted by fastening screws 7 to the grippers 1 which are thus supported by the carriers 5.

Positioned above the elongate beams 3 is a primary fluid-operated system 8 in the form of two pneumatic cylinders 8*a* which are secured to sidewalls of the housing 2. Reciprocating in the pneumatic cylinders 8*a* are piston rods 9 for respective connection to the carriers 5. The fluid-operated system 8 is so configured that the carriers 5 are moved in opposition to one another by the piston rods 9. Both pneumatic cylinders 8*a* extend above the elongate beams 3 in longitudinal direction thereof, with both piston rods 9 pointing in opposite directions. As a consequence of the disposition of both pneumatic cylinders 8*a*, FIG. 1 shows the front of the pneumatic cylinder 8*a* to the left in FIG. 1 and the rear of the pneumatic cylinder 8*a* to the right in FIG. 1.

Disposed on the other free end of each of the carriers 5, in opposition to the attachment 6, is a further attachment 10 which extends upwards to the associated pneumatic cylinder 8*a*. Each attachment 10 is securely fixed on one end to a corresponding one of the carriers 5 and on the other end to a corresponding one of the piston rods 9 via a bracket 11.

Figure 2:
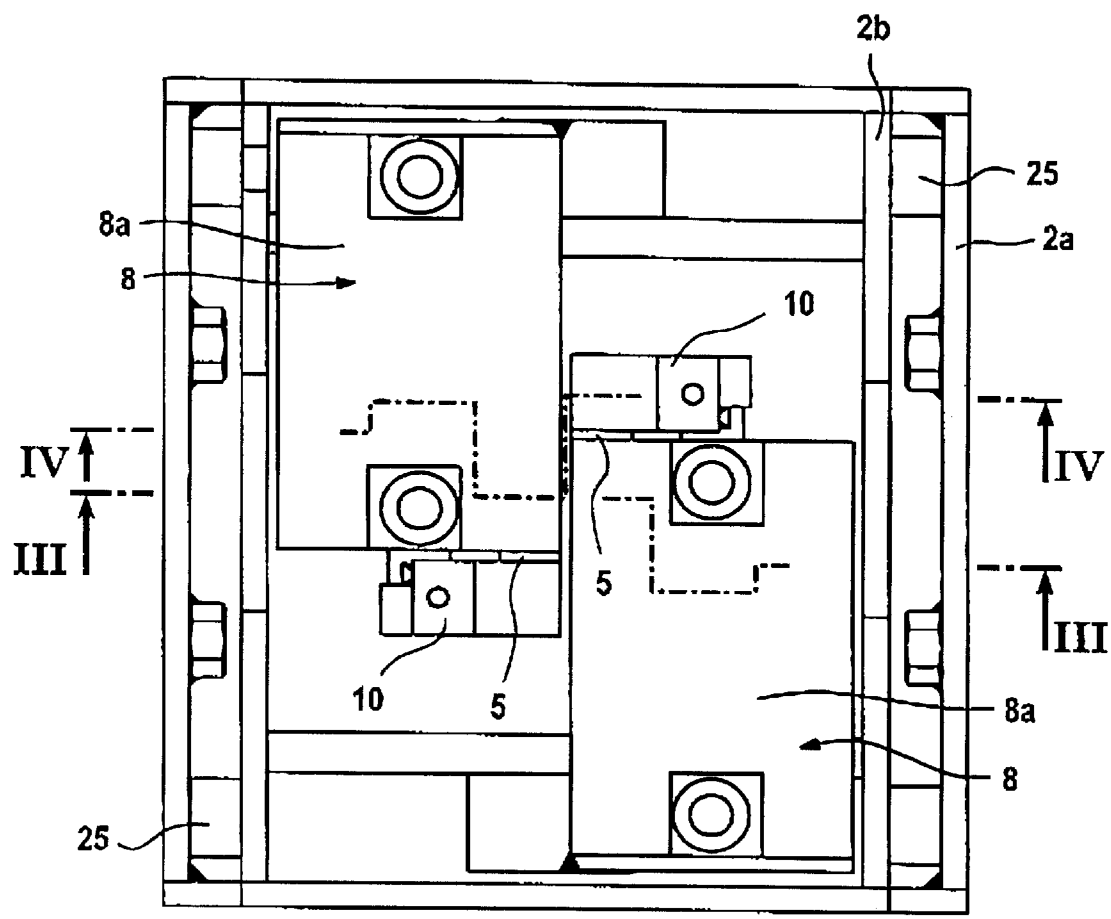
FIG. 2 is a plan view of the gripping apparatus of FIG. 1, having a modified housing configuration and showing the arrangement of a primary fluid-operated system.

Turning now to FIG. 2, there is shown a plan view of the gripping apparatus of FIG. 1, showing the arrangement of the primary fluid-operated system 8 with the two pneumatic cylinders 8*a*. In contrast to the configuration of FIG. 1, the housing 2 is shown as being of double-walled construction on two opposite sides (the right-hand side and left-hand side in FIG. 2). As shown in particular in FIG. 3, which is a vertical cross sectional view of the gripping apparatus, taken along the line III—III in FIG. 2, the housing 2 is composed of two housing portions 2*a*, 2*b* which are open on one side and fitted within one another at a formation of a gap-like free space 27. Received in the free space 27 are spacers 25 for interconnecting the housing portions 2*a*, 2*b*. The free space 27 also provides room for accommodating conduits (not shown) of the fluid-operated system 8 for conducting pneumatic fluid, e.g. air. Thus, the conduits are protected from external influence.

Figure 3:
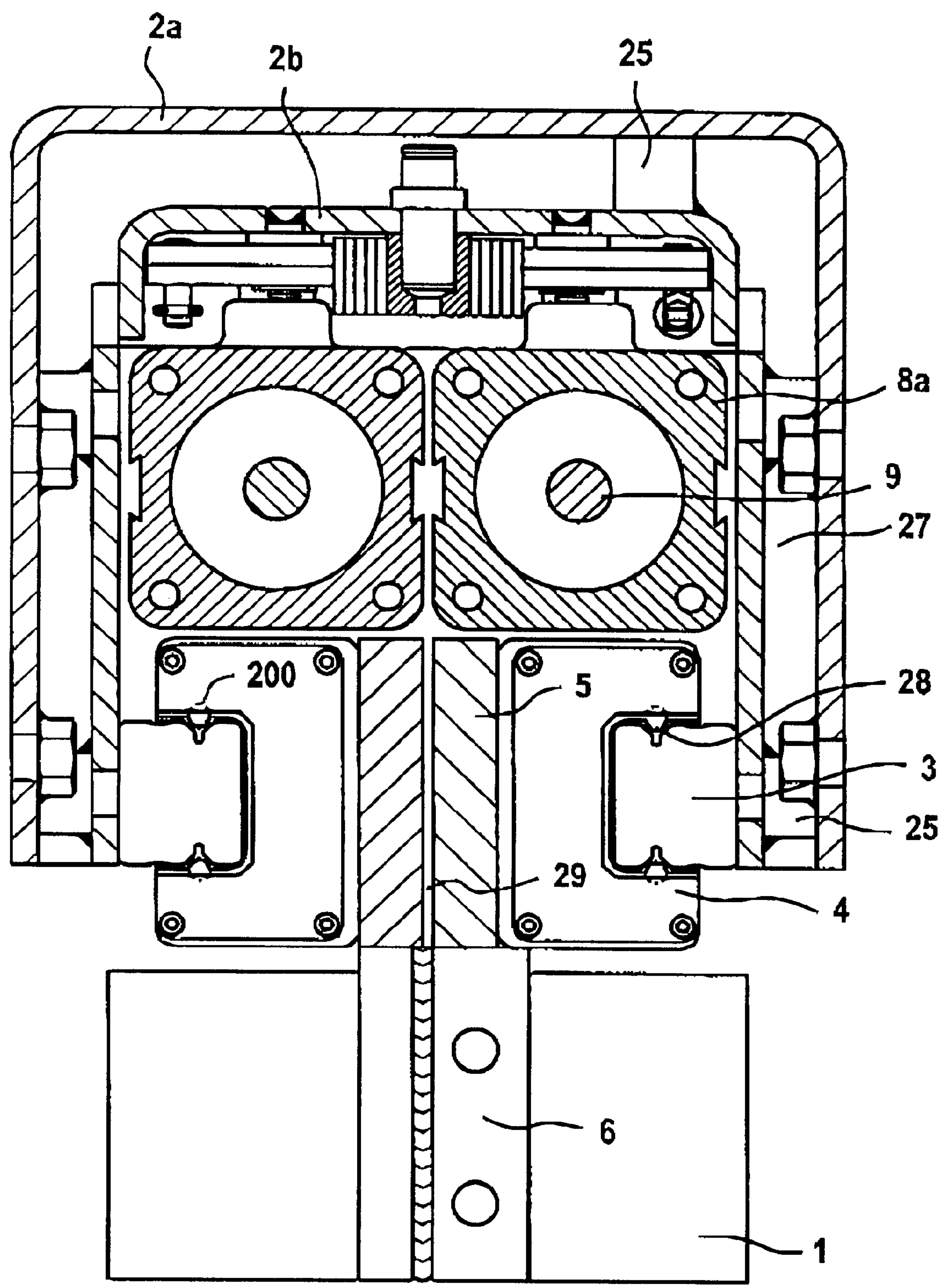
FIG. 3 is a vertical cross sectional view of the gripping apparatus, taken along the line III—III in FIG. 2.

FIG. 3 also shows in more detail the configuration of the runners 4 which have a generally U-shaped form and substantially embrace the elongate beams 5, except for the side adjoining the housing part 2*b*. Circulating about an inner raceway of each of the runners 4 are balls 200 which project into a complementary groove 28 of the elongate beams 3 and provide thereby a play-free support of the runners 4 upon the elongate beams 3. This type of support is also capable to absorb transverse forces and transverse moments. FIG. 3 further shows the formation of a small air gap 29 between the moving carriers 5.

Figure 4:
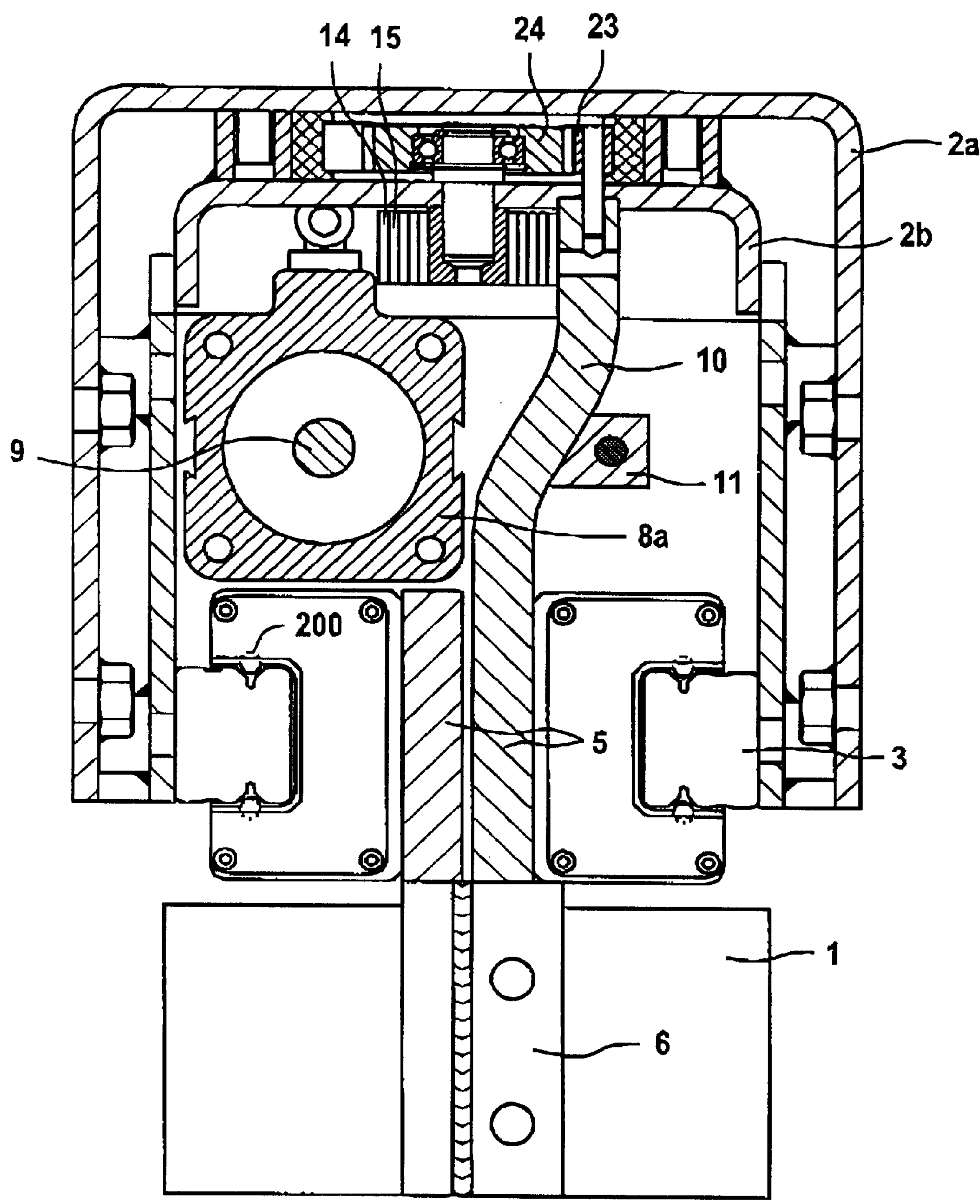
FIG. 4 is a vertical cross sectional view of the gripping apparatus, taken along the line IV—IV in FIG. 2.

Referring now to FIG. 4, which is a vertical cross sectional view of the gripping apparatus, taken along the line IV—IV in FIG. 2, the incorporation of an emergency holding mechanism and a synchronizing device can be seen above the pneumatic cylinders 8*a*. For ease of illustration, the emergency holding mechanism, which is shown in more detail in FIG. 6, and the synchronizing device, which is shown in more detail in FIG. 7, have been omitted from FIG. 2.

Figure 5:
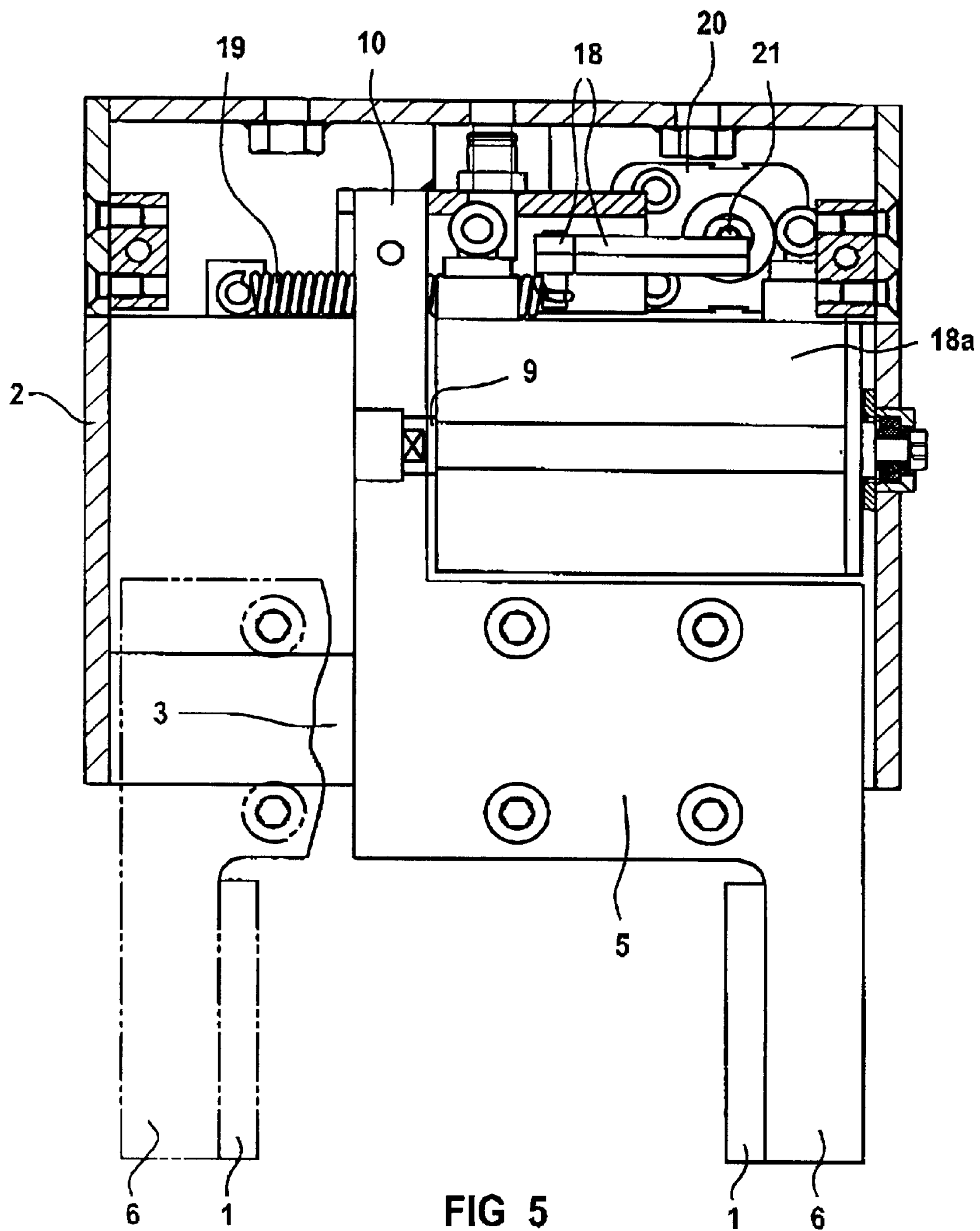
FIG. 5 is a vertical cross sectional view of the gripping apparatus, taken along the line V—V in FIG. 6.

FIG. 5 shows the carriers 5 in a disposition in which they are completely moved apart, as viewed transversely to their longitudinal extension. The carrier 5 on the left side of FIG. 5 is also shown by dash-dot line for ease of understanding. FIG. 5 further shows that the gripper elements 6 are arranged on both outwardly located ends of the pair of carriers 5.

Figure 6:
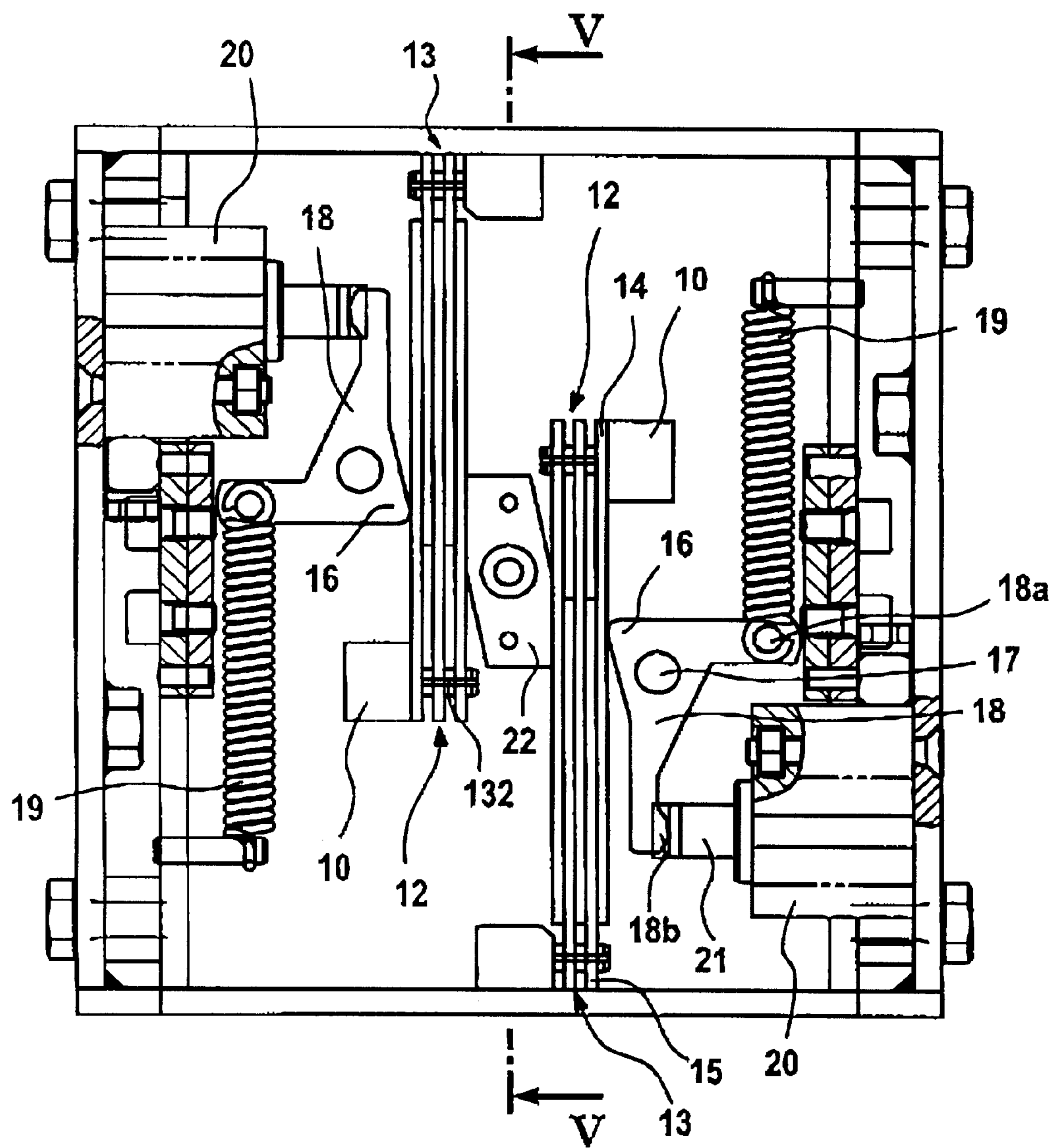
FIG. 6 is a plan view of the gripping apparatus of FIG. 1, showing the arrangement of an emergency holding mechanism.

Turning now to FIG. 6, there is shown in more detail the configuration of the emergency holding mechanism in the form of two multiple-plate assemblies, with each assembly including a first set 12 of flat sheet metal plates 14 spaced equally from one another in parallel relationship to the elongate beams 3 and securely fixed to a free end of a corresponding one of the second attachments 10 of the carriers 5, and a second set 13 of flat sheet metal plates 15 securely fixed to one end of the housing 2 in opposition to the attachment 10, whereby the plates 14, 15 engage one another so as to bear laterally upon each other and to move relative to one another in longitudinal direction. Acting upon the plates 14, 15 on the outer side of the multiple-plate assemblies are adjusters 16 which are swingably supported in the housing 2 for rotation about an axle 17. Each adjuster 16 is part of a swingable double-arm lever 18 which has one end 18*a* acted upon by a spring force applied by a spring 19. Acting on the opposite end 18*b* of the double-arm lever 18 is a piston rod 21 which reciprocates in a pneumatic auxiliary cylinder 20 forming part of a secondary fluid-operated system. As a result, a counterforce is applied on the end 18*b* of the lever 18 in correspondence with the pressure applied by the pneumatic cylinder 8*a* of the primary fluid-operated system 8. The spring 19 is hereby tensed so that the adjuster 16 is prevented from pressing against the plates 14, 15, when a sufficient pneumatic pressure is generated by the primary fluid-operated system 8.

In neutral state of the double-arm lever 18, the spring force and the counterforce are in balance. Suitably, the pneumatic auxiliary cylinders 20 of the secondary fluid-operated system, and the pneumatic cylinders 8*a* of the secondary fluid-operated system 8 are supplied with pneumatic fluid, e.g. air, from a same pressure source. When the spring force and the counterforce are out of balance, the adjusters 16 press against the plates 14, 15 at a pressure that equals a difference between the spring force and counterforce, whereby the plates 14, 15 are suitably supported on the opposite side of the adjusters 16 by the housing 2 via an abutment 22. As a consequence, when encountering a pressure drop in the pneumatic cylinders 8*a*, the adjusters 16 so compress the plates 14, 15 as to compensate for the pressure drop in the primary fluid-operated system 8 to thereby maintain a sufficient clamping force of the grippers 1. A failure in the primary fluid-operated system 8 results therefore in a sufficient compressing of the grippers 1 so that the grasped load will not be released.

As further shown in FIG. 6, the double-arm lever 18 is configured as a substantially triangular plate (double plate), whereby two neighboring corners form the ends 18*a*, 18*b* of the double-arm lever 18, whereas the third rounded and lobed corner forms the adjuster 16. The plate is hereby rotatable, roughly, about its center point.

Figure 7:
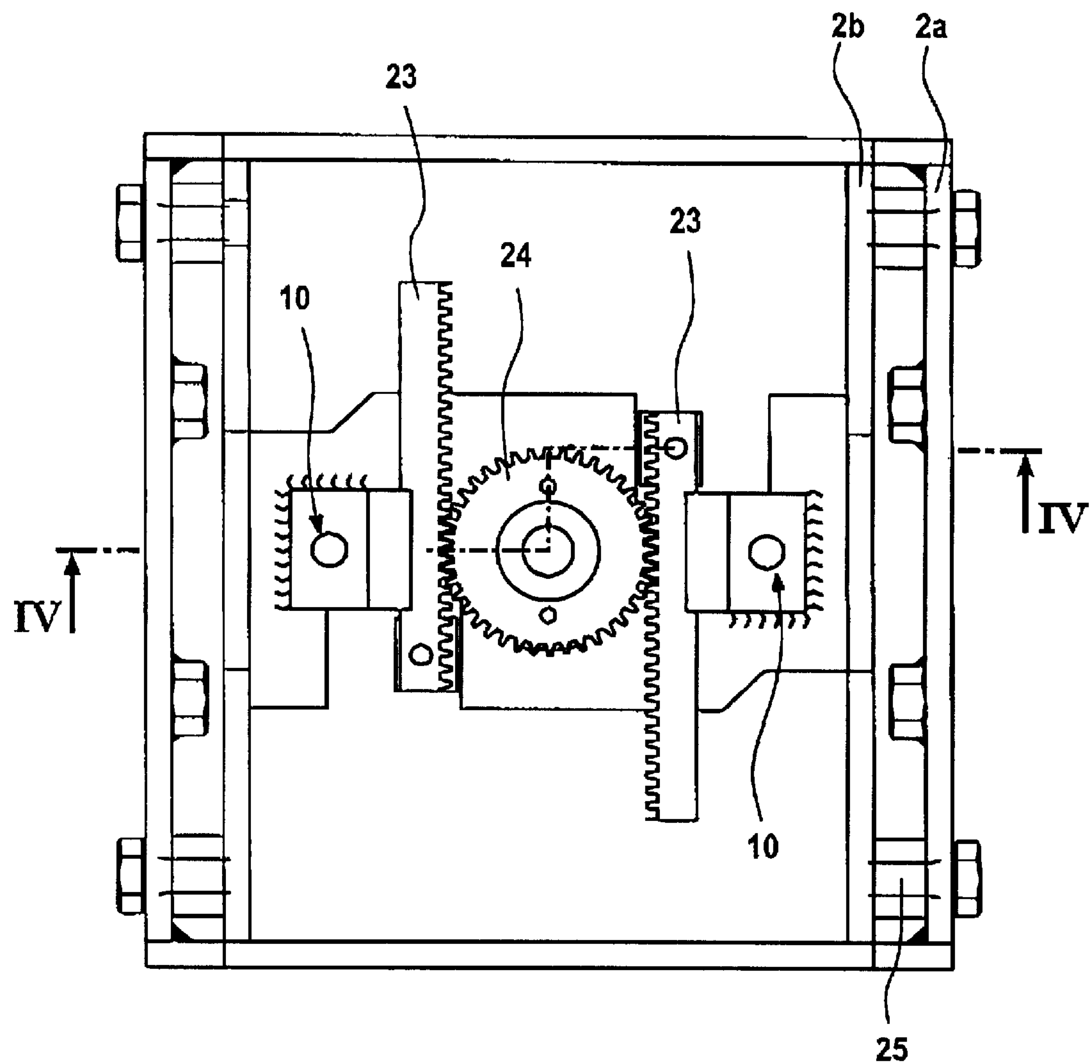
FIG. 7 is a plan view of the gripping apparatus of FIG. 1, showing the arrangement of a synchronizing device.

FIG. 7 illustrates in greater detail the synchronizing device which is positioned in the housing 2 above the emergency holding mechanism, as shown in FIG. 4. The synchronizing device includes two racks 23 in parallel relationship, with the teeth of the racks 23 confronting one another. The racks 23 are respectively secured to the attachments 10 of the carriers 5 and thus move in unison with the grippers 1. To synchronize their longitudinal displacement in opposition to one another, both racks 23 are interconnected by a pinion 24 arranged between the racks 23 and in mesh with the teeth of the racks 23.

While the invention has been illustrated and described as embodied in an apparatus for grasping a load from above or from the side, in particular for use in a manipulator, it is not intended to be limited to the details shown since various modifications and structural changes may be made without departing in any way from the spirit of the present invention.

What is claimed as new and desired to be protected by Letters Patent is set forth in the appended claims:

1. Apparatus for grasping a load from above or from the side, in particular for use in a manipulator, comprising:

a pair of fixed elongate beams disposed in parallel relationship and defining a longitudinal axis;

a pair of carriers extending in a direction of the elongate beams, each of the carriers being supported by a corresponding one of the elongate beams and guided for displacement longitudinally in the direction of the elongate beams, whereby the carriers and the elongate beams are placed into one-to-one correspondence, said carriers being disposed in spaced-apart side-by-side relationship, when viewed in a direction of the longitudinal axis, and movable relative to one another so as to overlap at least along a portion thereof;

a pair of confronting grippers, each of the carriers having an inner end and an outer end, when viewed in a direction transversely to the longitudinal axis, wherein one of the grippers is secured to the outer end of one of the carriers and the other one of the grippers is secured to the outer end of the other one of the carriers; and a primary fluid-operated system, including two fluid-operated mechanisms operatively connected to the carriers in one-to-one correspondence, for moving the carriers in opposition to one another.

2. The apparatus of claim 1 wherein the grippers are secured to the carriers at a location which is above or below the elongate beams.

3. The apparatus of claim 1, and further comprising a housing, wherein the two fluid-operated mechanisms are supported by the housing on opposite sides.

4. The apparatus of claim 3, wherein each of the carriers has a first attachment projecting out of the housing for securement to a corresponding one of the grippers.

5. The apparatus of claim 4 wherein each carrier has a second attachment disposed transversely to the carrier, said first and second attachments being disposed on different ends of the carriers and facing away from one another.

6. The apparatus of claim 3 wherein each of the fluid-operated mechanisms includes a pneumatic cylinder and a piston rod moveable in and out of the pneumatic cylinder.

7. The apparatus of claim 6 wherein each carrier has an attachment disposed transversely to the each said pneumatic cylinder secured to the housing, with the piston rod secured to a corresponding one of the carriers via the attachment.

8. The apparatus of claim 7, and further comprising a synchronizing mechanism for synchronization of a movement of the carriers, said synchronizing mechanism including a pair of racks in parallel relationship to the elongate beams, and a pinion disposed between and in mesh with the racks for synchronizing a movement of the racks in opposition to one another, each said rack being mounted to one end of the second attachment of a corresponding one of the carriers, whereby the racks and the carriers are placed into one-to-one correspondence.

9. The apparatus of claim 7, and further comprising an emergency holding mechanism for compensating a pressure drop in the primary fluid-operated system and resultant decrease of a clamping force, said emergency holding mechanism including a pair of multiple-plate assemblies, each of the multiple-plate assemblies including a first set of flat plates spaced equally from one another in parallel relationship to the elongate beams and securely fixed to a free end of a corresponding one of the second attachments of the carriers, a second set of flat plates securely fixed to one end of the housing, whereby the plates of the first and second sets of flat plates bear laterally upon one another, and an adjuster compressing the plates of the first and second sets of plates when encountering a pressure drop of the primary fluid-operated system.

10. The apparatus of claim 9 wherein the adjuster includes a swingable double-arm lever, each said multiple-plate assembly further including a spring mounted to one end of the lever and applying a spring force, and a secondary fluid-operated system for applying a counterforce on another end of the lever commensurate with a pressure applied by the primary fluid-operated system so that the adjuster acts against one side of the plates of the first and second sets of flat plates at a force which corresponds to a difference of the spring force and the counterforce.

11. The apparatus of claim 10 wherein the secondary fluid-operated system includes a pneumatic auxiliary cylinder and a piston rod moveable in and out with respect to the pneumatic auxiliary cylinder, said piston rod of the secondary fluid-operated system acting upon the other end of the lever, and further comprising a pressure source for supply of fluid to the pneumatic auxiliary cylinders of the secondary fluid-operated system and the pneumatic cylinders of the primary fluid-operated system.

12. The apparatus of claim 10 wherein the double-arm lever is configured as a triangular plate, with two neighboring corners defining the one end of the lever and the other end of the lever, and a third corner of the lever defining the adjuster.

13. The apparatus of claim 12 wherein the triangular plate defines a center and is rotatable about the center.

14. The apparatus of claim 1 wherein the elongate beams are profiled rails.

15. The apparatus of claim 14, and further comprising a pair of running elements, each of the running elements at least partially embracing a corresponding one of the carriers and engaging one of the profiled rails, whereby the running elements and the carriers are placed into one-to-one correspondence.

16. The apparatus of claim 15 wherein each said running element has a U-shaped configuration and includes balls circulating in the running element for support upon the corresponding one of the profiled rails.

17. The apparatus of claim 1 wherein each of the grippers is configured as a plate-shaped clamping jaw.

18. The apparatus of claim 1, and further comprising a housing accommodating the elongate beams and the carriers, said housing including two housing parts open on one end and fitting within one another at a formation of a gap-like free space, and spacer elements received in the free space for interconnecting the housing parts.

* * * * *